United States Patent
Kim et al.

(10) Patent No.: US 8,049,593 B2
(45) Date of Patent: Nov. 1, 2011

(54) UNIVERSAL REMOTE CONTROL APPARATUS AND METHOD BASED ON SERVICE PROFILES

(75) Inventors: Jun Hyeong Kim, Anvang-si (KR); Sang Do Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 905 days.

(21) Appl. No.: 12/035,465

(22) Filed: Feb. 22, 2008

(65) Prior Publication Data

US 2009/0096633 A1   Apr. 16, 2009

(30) Foreign Application Priority Data

Oct. 16, 2007   (KR) .................. 10-2007-0104094

(51) Int. Cl.
   *G05B 19/02* (2006.01)
(52) U.S. Cl. ............ 340/4.31; 340/13.25; 341/176; 345/169; 348/734; 348/E5.103
(58) Field of Classification Search .......... 340/825.22, 340/825.69; 341/176, 20, 21; 345/169; 348/734, 348/E5.103
See application file for complete search history.

(56) References Cited

U.S. PATENT DOCUMENTS

| 6,882,299 | B1* | 4/2005 | Allport | 341/176 |
| 7,230,563 | B2* | 6/2007 | Vidal | 341/176 |

FOREIGN PATENT DOCUMENTS

| JP | 2001-136407 | 5/2001 |
| JP | 2006-014013 | 1/2006 |
| KR | 10-20040067686 | 7/2004 |
| KR | 10-20040082819 | 9/2004 |
| KR | 10-20050094255 | 9/2005 |

* cited by examiner

*Primary Examiner* — Benjamin C Lee
*Assistant Examiner* — Peter Mehravar
(74) *Attorney, Agent, or Firm* — NSIP Law

(57) ABSTRACT

A universal remote control apparatus and method for controlling various types of devices and equipments, the universal remote control apparatus includes a service profile generator which generates a service profile based on first device information and second device information that are recognized from at least one device, a service profile management unit which stores and manages the generated service profile, a service profile-based control unit which universally controls the at least one device based on the service profile, and a user interface unit which receives from a user a first selection on a first device object corresponding to the first device information and a second selection on a second device object corresponding to the second device information.

19 Claims, 13 Drawing Sheets

```
<serviceProfile title="Watching DVD">
   <service serviceId=service1>
      <streamSource function=DVDP id=dvdp1>
         <output dataType=video/component port=component1 />
         <output dataType=audio/optic port=optic />
         <control>
            <power value=on delay=2 />
            <transport action=play />
         </control>
      </streamSource>
      <streamSink function=TV id=tv1>
         <input dataType=video/component port=component2/>
         <control>
            <power value=on delay=2/>
            <channel value=3/>
            <selectInput port=component2 />
         </control>
      </streamSink>
      <streamSink function="AV RCV" id=avrcv1>
         <input dataType=audio/optic port=optic />
         <control>
            <power value=on delay=2 />
            <selectInput port=optic />
         </control>
      </streamSink>
   </service>

<service serviceId=service2>
      <standalone function=LIGHT id=light1>
         <input dataType=favorite/light />
         <control>
            <brightness value=off />
         </control>
      </standalone>
      <favoriteSource function=LIGHT-CONFIG id=lightOff>
         <output dataType=favorite/light />
         <brightness value=off />
      </favoriteSource>
   </service>
</serviceProfile>
```

UNIVERSAL REMOTE CONTROL APPARATUS AND METHOD BASED ON SERVICE PROFILES

CROSS-REFERENCE TO RELATED APPLICATION

This application claims the benefit under 35 U.S.C. §119 (a) of a Korean Patent Application No. 10-2007-0104094, filed on Oct. 16, 2007, in the Korean Intellectual Property Office, the entire disclosure of which is incorporated herein by reference.

TECHNICAL FIELD

The following description relates to a remote control apparatus and method of controlling various types of devices and equipments, and more particularly, to a universal remote control apparatus and method of controlling various types of devices and equipments based on services profiles.

BACKGROUND

A remote controller is designed to control a device in a remote place. However, as types of devices are diversified and the number of devices increases, the number of remote controllers needed to control the devices is also increasing. The increase in the number of remote controllers may cause user inconvenience in managing and using the remote controllers. Specifically, when features of devices being controlled are different from each other, user interfaces of the remote controllers may also be different. Therefore, it is difficult to effectively control the remote controllers. Also, when the devices being controlled are manufactured by different manufacturers, the remote controllers may be incompatible. Therefore, despite the above user inconvenience, many users generally have the same number of remote controllers as the number of devices being controlled, and select a corresponding remote controller as necessary and control a device.

To solve the above-described problems and the user inconvenience, some electronic device manufacturers provide a universal remote controller capable of controlling all products of a corresponding company using one remote controller. However, even in this case, it may not be possible to control products of another company.

Even in the case of a remote controller with a macro function, since the macro pre-programs control operations and assigns the programmed control operations on a particular button, it may be inconvenient to program the macro when the configuration of a device is uncontrollable using standardized patterns.

Also, the remote controller using the macro function cannot provide a multiple service that can control various types of devices including a peripheral device, for example, a light device, according to a circumstance or a user taste.

Accordingly, there is a need for a universal remote control apparatus and method of controlling various types of devices based on service profiles.

SUMMARY

In one general aspect, there is provided a universal remote control apparatus and method based on service profiles that provides a plurality of related services and universally controls various types of devices.

In another general aspect, there is provided a universal remote control apparatus and method that determines a type of a device being controlled and dynamically adjusts each device state according to a user taste, based on the determined device type.

In still another general aspect, there is provided a universal remote control apparatus and method that integrally provides at least one related service, such as a home entertainment service, a home automation service, and the like, without following standardized patterns.

In yet another general aspect, a universal remote control apparatus includes: a service profile generator which generates a service profile based on first device information and second device information that are recognized from at least one device; a service profile management unit which stores and manages the generated service profile; a service profile-based control unit which universally controls the at least one device based on the service profile; and a user interface unit which receives from a user a first selection on a first device object corresponding to the first device information and a second selection on a second device object corresponding to the second device information.

In still another general aspect, a universal remote control system includes: at least one device which stores and manages device information; and a universal remote control apparatus which recognizes the device information from the at least one device, and generates a service profile, wherein the universal remote control apparatus includes: a service profile generator which generates a service profile based on first device information and second device information that are recognized from the at least one device; a service profile management unit which stores and manages the generated service profile; a service profile-based control unit which universally controls the at least one device based on the service profile, using a communication interface unit; and a user interface unit which receives from a user a first selection on a first device object corresponding to the first device information and a second selection on a second device object corresponding to the second device information.

In yet another general aspect, a universal remote control method for controlling at least one device, includes: recognizing, using a user interface unit, device information from the at least one device to provide a user with at least one device object wherein the device information includes first device information and second device information; receiving, using the user interface unit, from the user a first selection on a first device object corresponding to the first device information and a second selection on a second device object corresponding to the second device information; and generating, using a service profile generator, a service profile based on the first device information and the second device information.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
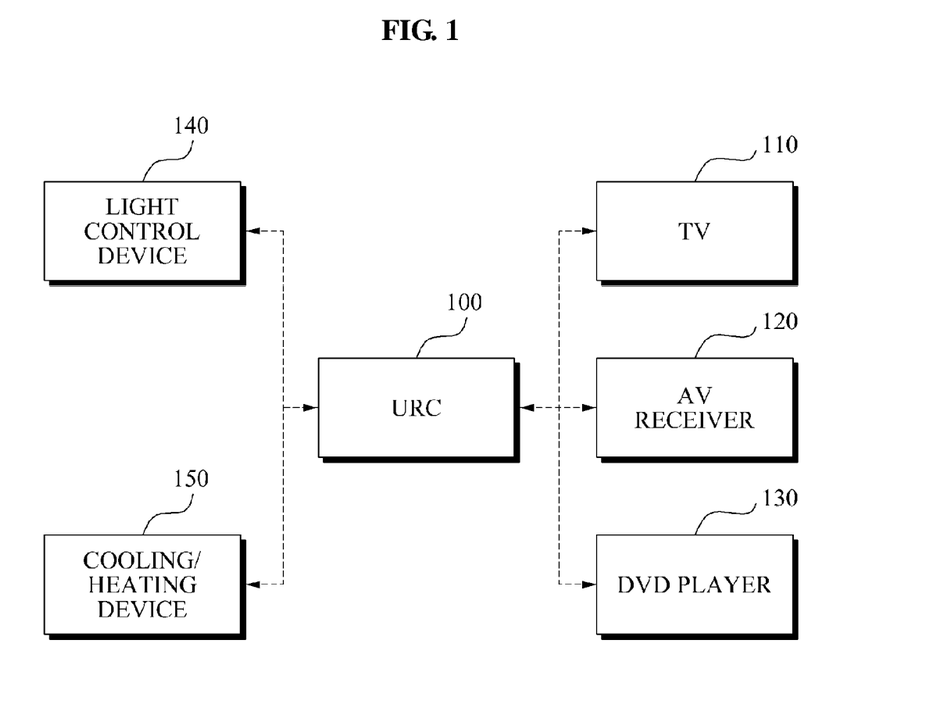
FIG. 1 is a diagram illustrating a universal remote control system according to an exemplary embodiment.

FIG. 1 illustrates a universal remote control system according to an exemplary embodiment.

Referring to FIG. 1, the universal remote control system includes a universal remote control apparatus (URC) 100 and at least one device, a television (TV) 110, an audio/video (AV) receiver 120, a digital video disc (DVD) player 130, a light control device 140, and a cooling/heating device 150. The universal remote control apparatus 100 recognizes device information from the devices 110, 120, 130, 140, and 150 and generates service profiles based on the recognized device information. The universal remote control apparatus 100 controls the devices 110, 120, 130, 140, and 150 using a wireless uni-directional communication such as infrared (IR), a wireless bidirectional communication such as a radio frequency (RF), and the like. The universal remote control apparatus 100 may obtain device information, such as existence of a device, a device type, a device manufacturer, a model serial number corresponding to the device manufacturer, and the like, using a discovery protocol, or may receive the device information from a user.

FIGS. 2A through 2D illustrate an example of a device object that is provided for a user using a universal remote control apparatus according to an exemplary embodiment.

Referring to FIGS. 2A through 2D, the universal remote control apparatus provides a recognized device as a device object 200 using a predetermined user interface unit. The device object 200 provides a user with device type information, device function information, and device identification (ID) information. The device type information denotes information regarding whether the device transmits and receives stream data. The device type information may include at least one of a stream source type, a stream sink type, a standalone type, and a favorite source type. The device function information denotes information about a functional feature of the device, such as a TV, a DVD player, an AV receiver, and the like. The device ID information denotes information about a device identifier and is used to identify the device.

The stream data indicates flow of data. The stream data may be classified into a multimedia stream, a data stream, and a favorite stream based on a data type. The multimedia stream may be classified into a video stream and an audio stream. The multimedia stream is generally transmitted/received between home entertainment devices. Also, the data stream denotes flow of data excluding the multimedia stream, and the favorite stream corresponds to a virtual stream for operating the device according to a user taste. The favorite stream may include information about the brightness of a light device, the temperature of a cooling/heating device, a favorite TV channel, and the like. The type of stream data according to the exemplary embodiment may be provided in a Multipurpose Internet Mail Extension (MIME) format, such as video/composite, audio/optic, favorite/tv, and the like.

Figure 2A:
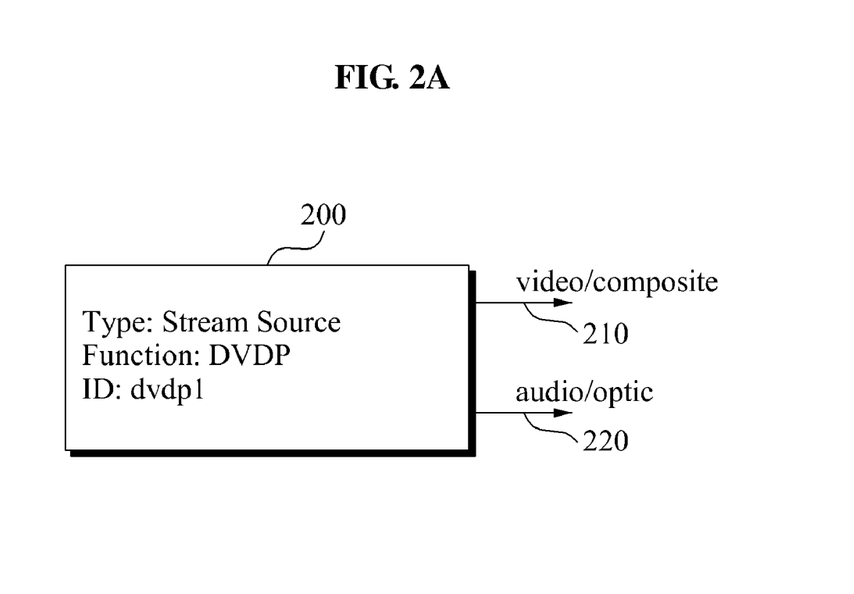
FIGS. 2A through 2D illustrate an example of a device object that is provided for a user using a universal remote control apparatus according to an exemplary embodiment.

Referring to FIG. 2A, a device object 200 of FIG. 2A is a stream source type. The device object 200 includes at least one output interface 210 and 220 that provides either the multimedia stream or the data stream to a stream sink type device such as a DVD player. The universal remote control apparatus maps the output interfaces 210 and 220 with the stream data type such as video/composite and audio/optic and provides the user with the mapped stream data type. Also, the device object 200 includes device function information DVDP and device ID information dvdp1.

Figure 2B:
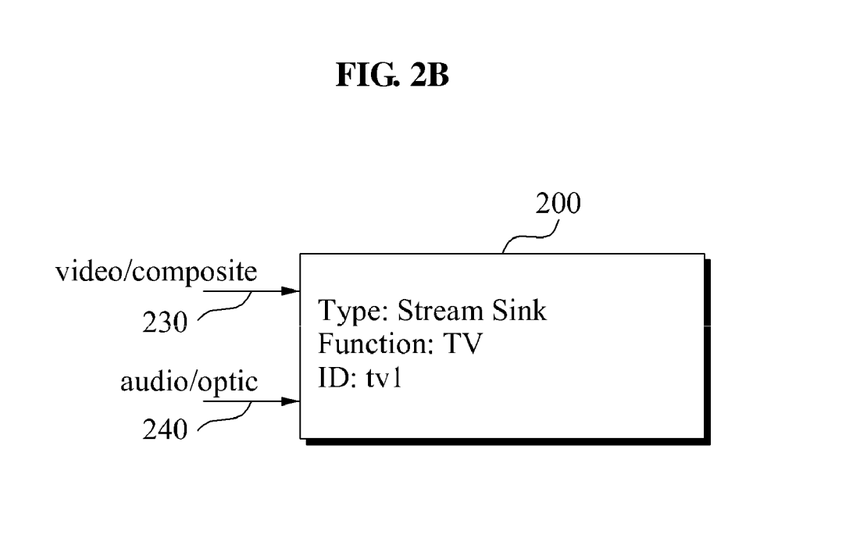

Referring to FIG. 2B, a device object 200 of FIG. 2B is a stream sink type. The device object 200 receives stream data from the stream source type device such as a TV, and includes at least one input interface 230 and 240 that can receive and process the multimedia stream or the data stream. The universal remote control apparatus maps the input interfaces 230 and 240 with the stream data type and provides the user with the mapped stream data type. Also, the device object 200 includes device function information TV and device ID information tv1.

Figure 2C:
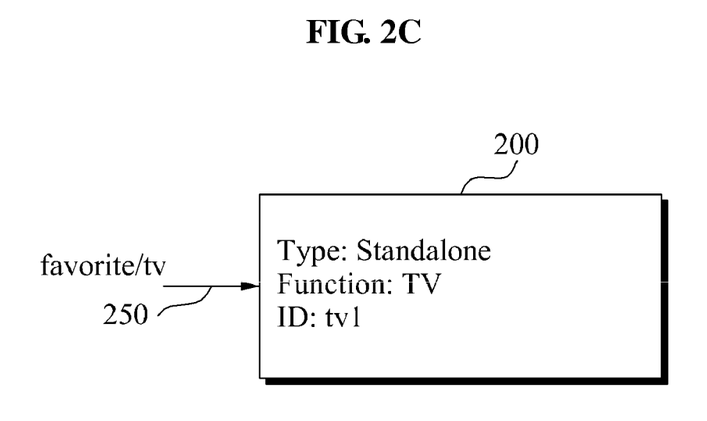

Referring to FIG. 2C, a device object 200 of FIG. 2C is a standalone type. The device object 200 alone provides a service without transmitting or receiving the stream data such as a light device and a TV. The device object 200 includes an input interface 250 mapped with a stream data type favorite/tv. Also, the device object 200 includes device function information TV and device ID information tv1. Specifically, the device object 200 receives favorite type stream data using the input interface 250. The universal remote control apparatus may control the TV device corresponding to the favorite type stream data.

Figure 2D:
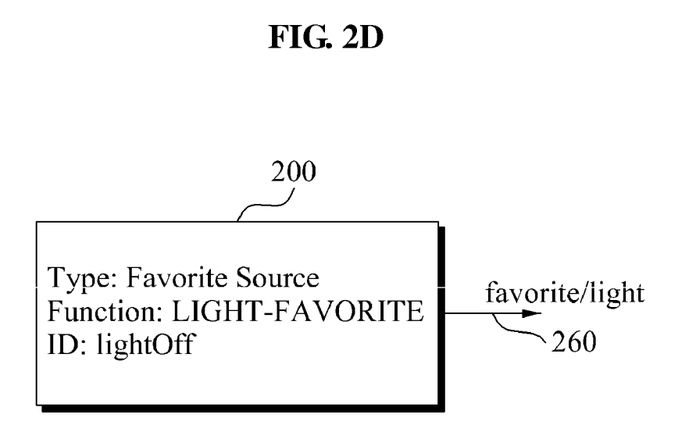

Referring to FIG. 2D, a device object 200 of FIG. 2D is a favorite source type and includes device function information LIGHT-FAVORITE, device ID information lightOff. An output interface 260 is mapped with a stream data type favorite/light. Specifically, the device object 200 may output stream data of the stream data type favorite/light using the output interface 260. The stream data type favorite/light may enable a different type of device to turn off a light.

Figure 3:
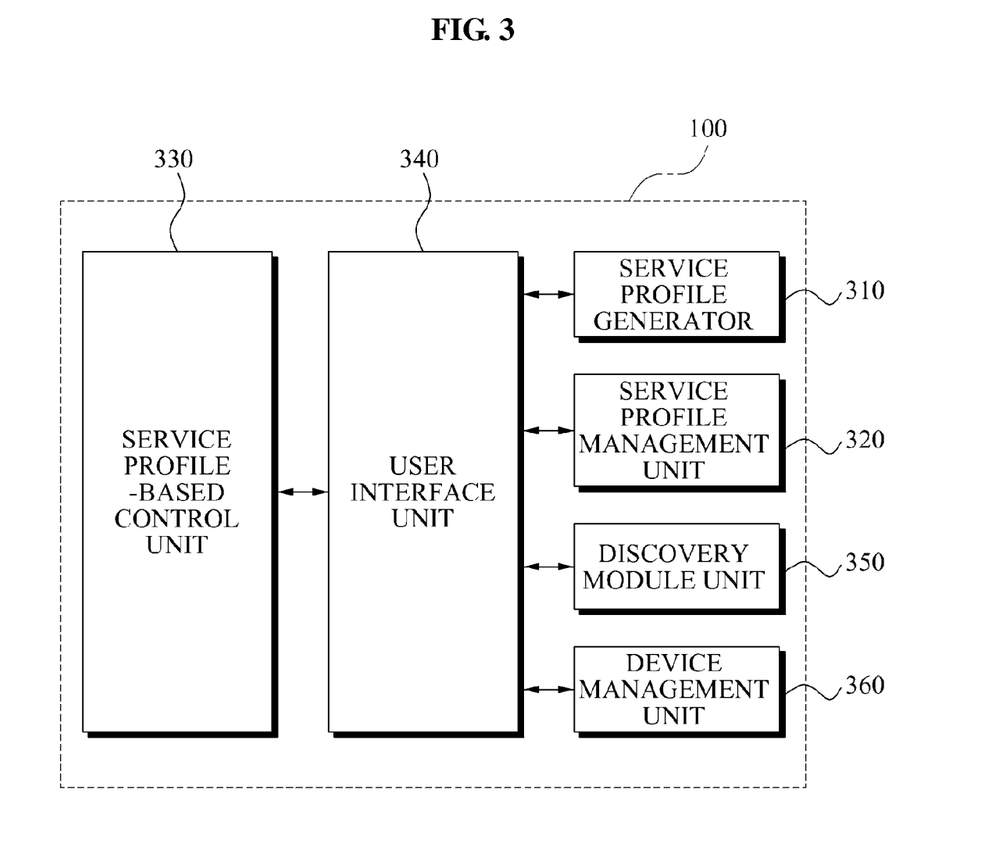
FIG. 3 is a block diagram illustrating a configuration of a universal remote control apparatus according to an exemplary embodiment.

FIG. 3 illustrates a configuration of a universal remote control apparatus 100 according to an exemplary embodiment.

Referring to FIG. 3, the universal remote control apparatus 100 includes a service profile generator 310, a service profile management unit 320, a service profile-based control unit 330, and a user interface unit 340.

The service profile generator 310 generates a service profile based on first device information and second device information that are recognized from at least one device. The service profile is an operational unit that connects the at least one device to each other to provide a user with an integrated control service. Therefore, the service profile may include a plurality of services. One service may be generated based on control information by the service profile generator 310. The control information includes at least one stream source type device, at least one stream sink type device, and at least one favorite source type device that are selected by the user and connected to each other. Also, another service may be generated by the service profile generator 310, based on control information. The control information includes at least one standalone type device and at least one favorite source type device that are selected by the user and connected to each other.

The service profile management unit 320 stores and manages the generated service profile. The service profile-based control unit 330 universally controls the at least one device based on the service profile. The service profile management unit 320 may store and manage the service profile in a format of an eXtensible Markup Language (XML) document. The service profile-based control unit 330 may control the at least one device using a wireless uni-directional communication or a wireless bi-directional communication.

The user interface unit 340 receives from a user a first selection on a first device object corresponding to the first device information and a second selection on a second device object corresponding to the second device information. Specifically, in order to generate control information for generating the service profile, the user interface unit 340 provides the user with the first device object and the second device object. According the exemplary embodiments, it is possible to provide a plurality of related services and universally control various types of devices. Also, a user may determine a type of a device being controlled and dynamically adjust each device state according to a user taste, based on the determined device type.

As described above with reference to FIGS. 2A through 2D, the second device object includes an input interface that matches a stream data type of an output interface of the first device object. The service profile generator 310 maps the stream data type with the output interface of the first device object that is selected from the first selection. The service profile generator 310 provides the user with the mapped stream data type using the user interface unit 340, and generates connection information between the first device object and the second device object. The service profile generator 310 generates control information for controlling a first device and a second device based on the connection information, and generates the service profile that includes the control information. More specifically, when the user selects the first device object as a stream source type through the first selection using the user interface unit 340, the user may select the second device object as a stream sink type using the user interface unit 340. In this case, the first device object outputs the multimedia stream or the data stream using the output interface of the first device object. The second device object generates connection information to receive the multimedia stream or the data stream using an input interface of the second device object. Next, the service profile generator 310 generates control information for controlling a first device and a second device based on the connection information, and generates the service profile that includes the control information.

The universal remote control apparatus 100 may further include a discovery module unit 350 and a device management unit 360 that stores and manages device information. The discovery module unit 350 discovers a device and recognizes device information from the discovered device. For the above operation, the discovery module unit 350 may recognize the device based on a multicast-based discovery protocol. If the device does not support the discovery protocol, the discovery module unit 350 may receive device information using the user interface unit 340. More specifically, the discovery module unit 350 may receive a manufacturer or a model name of the device from the user and extract device information corresponding to the manufacturer or the model name from the device management unit 360.

Figure 4:
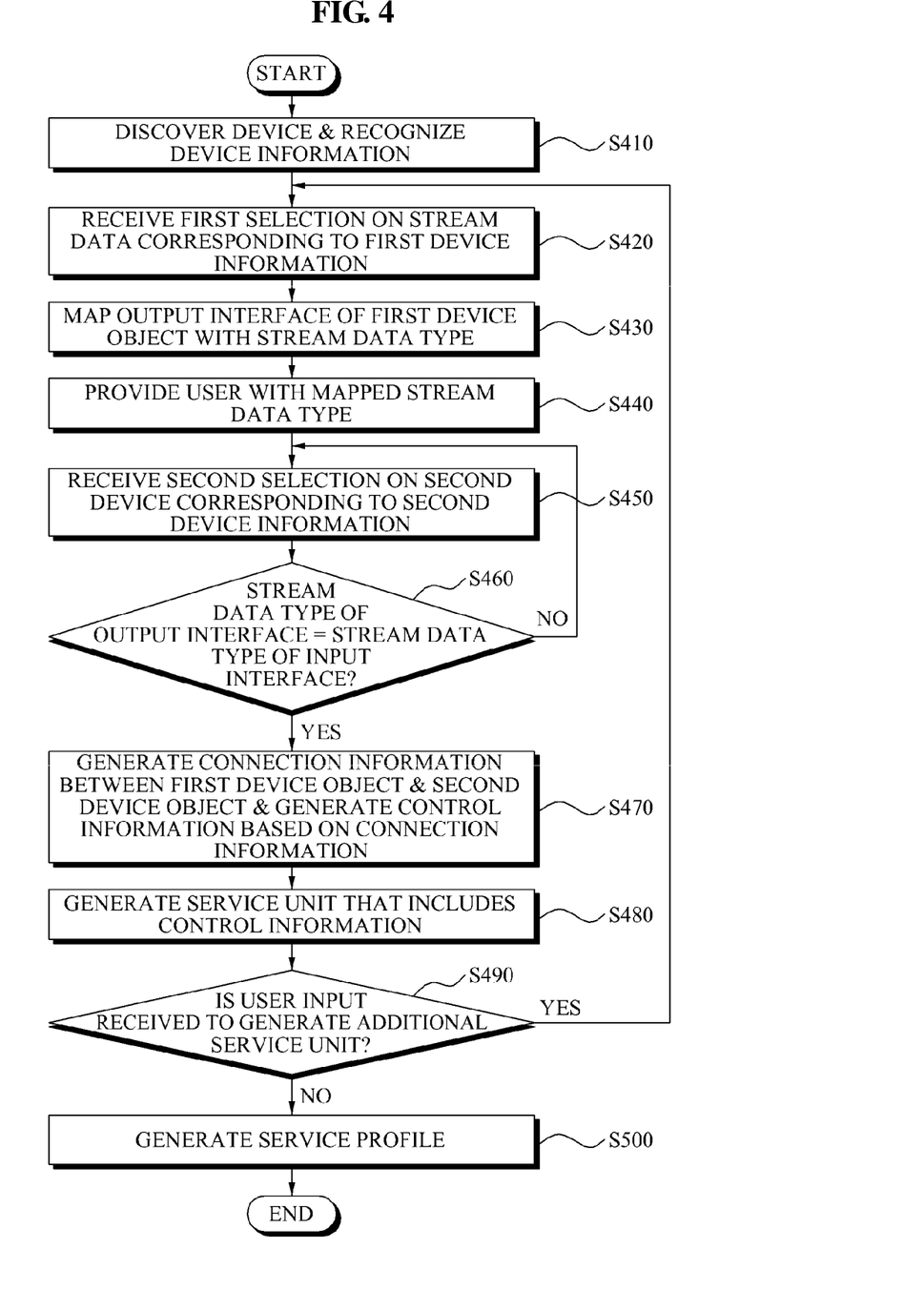
FIG. 4 is a flowchart illustrating a universal remote control method for controlling a device according to an exemplary embodiment.

FIG. 4 illustrates a universal remote control method for controlling a device according to an exemplary embodiment.

Referring to FIG. 4, in operation S410, the universal remote control method recognizes device information from at least one device and provides a user with at least one device object using a user interface unit. The device information includes first device information and second device information. More specifically, in operation S410, the universal remote control method may discover the device using a discovery module unit and thereby recognize the device information.

In operation S420, the universal remote control method receives from the user a first selection on a first object corresponding to the first device information using the user interface unit. In operation S430, the universal remote control method maps an output interface of the selected first device object with a stream data type. In operation S440, the universal remote control method provides the user with the mapped stream data type using the user interface unit.

In operation S450, the universal remote control method receives from the user a second selection on the second device object using the user interface unit. The second device object includes an input interface that matches the mapped stream data type. In this case, in operation S460, a service profile generator determines whether the stream data type mapped with the output interface of the first device object matches the stream data type of the input interface of the second device object. In the case of matching, the universal remote control method performs operation S470, otherwise receives the second selection on the second device object again, from the user.

In operation S470, when the stream data type mapped with the output interface of the first device object matches the stream data type of the input interface of the second device object, the service profile generator generates connection information between the first device object and the second device object and generates control information for controlling a first device and a second device based on the connection information.

In operation S480, the service profile generator generates a service unit that includes the generated control information. When a user input is not received to generate an additional service unit in operation S490, the universal remote control method finally generates a service profile in operation S500. Conversely, when the user input is received to generate the additional service unit in operation S490, the universal remote control method may perform operation S420 again. The service profile includes at least one service unit. As described above, it is possible to integrally provide a user with at least one related service such as a home entertainment service, a home automation service, and the like, without following standardized patterns.

Figure 5:
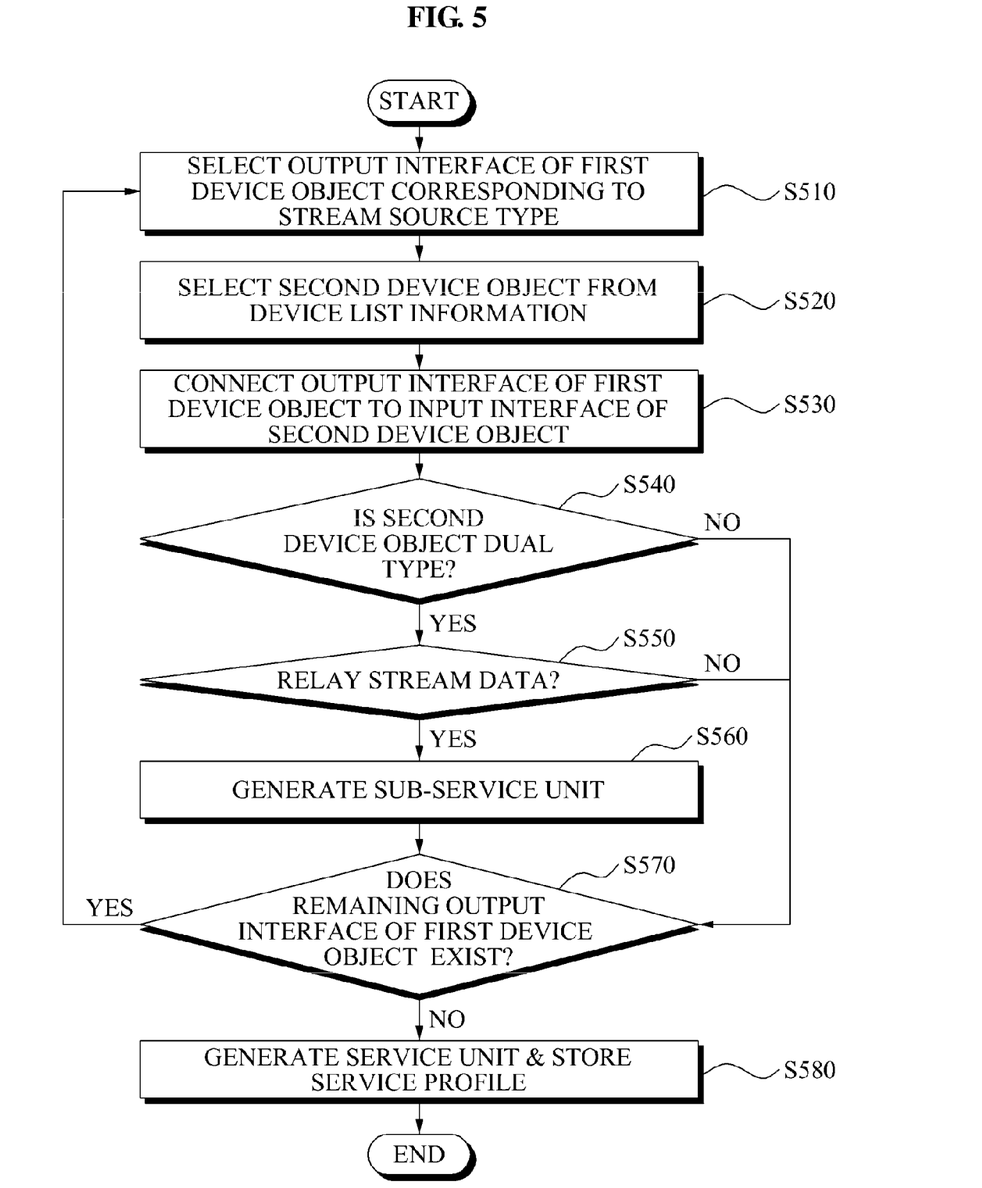
FIG. 5 is a flowchart illustrating an example of the universal remote control method of FIG. 4 that is performed by a user.

FIG. 5 illustrates an example of the universal remote control method of FIG. 4 that is performed by a user.

Referring to FIG. 5, the universal remote control method relates to when the first device of FIG. 4 is a stream source type. In operation S510, the user selects, using the user interface unit, any one output interface from at least one output interface that is included in the first device object of the stream source type. In operation S520, the user selects the second device object from device list information. In this instance, the second device object includes at least one input interface that matches a stream data type of the output interface of the first device object. In operation S530, the input interface of the selected second device object is connected to the output interface of the first device object.

In particular, when the second device object provides a stream sink type and the stream source type, that is, when the second device object is a dual type in operation S540, information about whether to relay stream data to a third device object is provided by the user in operation S550. In operation S560, a sub-service unit is generated to relay the stream data to the third device object.

In operation S570, it is determined whether there still exists a remaining output interface of the first device object that is not connected to the input interface of the second device object. When the remaining output interface exists, operation S510 is performed again. Conversely, when the remaining output interface does not exist, the service profile generator generates control information based on connection information between the first device object and the second device object, generates a service unit that includes the control information, and finally stores a service profile in operation S580.

Figure 6:
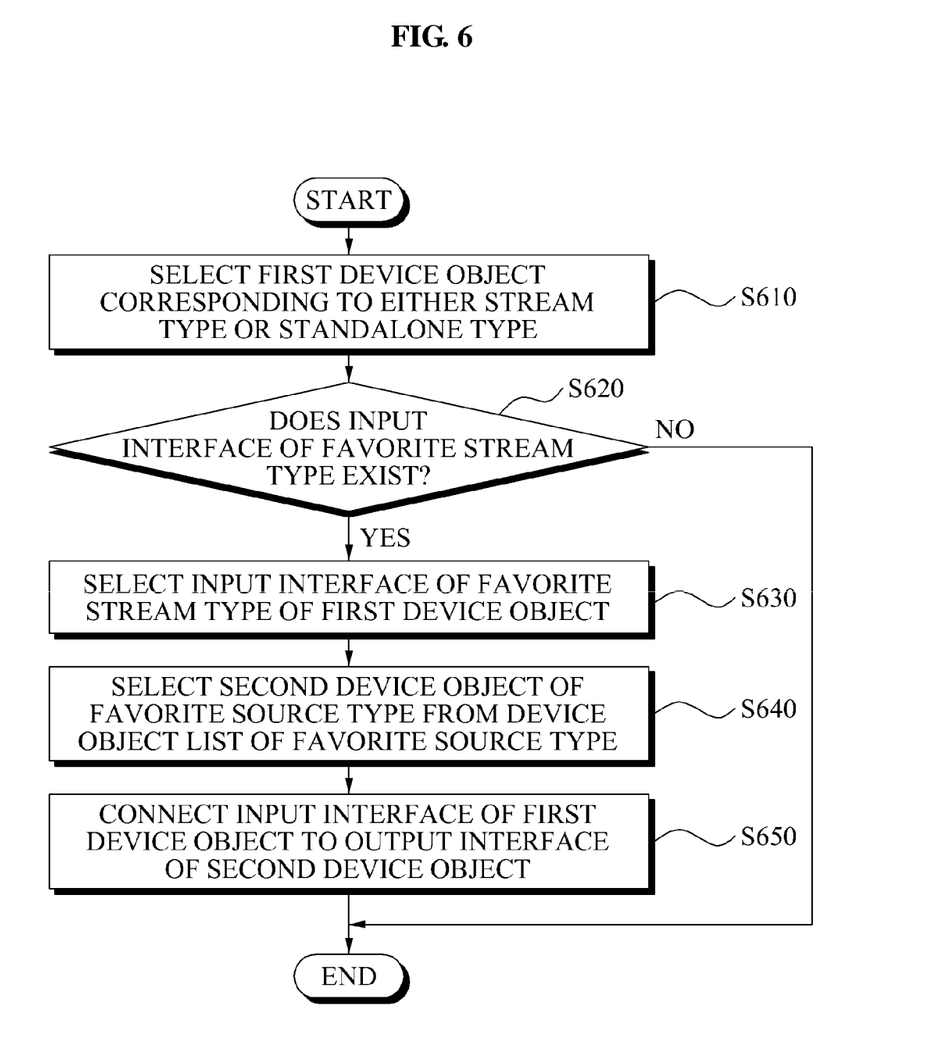
FIG. 6 is a flowchart illustrating another example of the universal remote control method of FIG. 4 that is performed by a user.

FIG. 6 illustrates another example of the universal remote control method of FIG. 4 that is performed by a user.

Referring to FIG. 6, the universal remote control method of FIG. 6 relates to when the first device of FIG. 4 corresponds to any one of a stream type that includes a stream source type and a stream sink type, and a standalone type, and the second device object of FIG. 4 corresponds to a favorite source type. In operation S610, the user selects the first device object corresponding to either the stream type or the standalone type using a user interface unit. In operation S620, it is determined whether the selected first device object includes an input interface of a favorite stream type. When the input interface of the favorite stream data type exists, the user selects the input interface of the favorite stream type of the first device object in operation S630. In operation S640, the user selects a second device object of a favorite source type from a device object list of the favorite source type. In operation S650, the input interface of the selected first device object is connected to the output interface of the second device object. Conversely, when the selected first device object excludes the input interface of the favorite stream type in operation S620, the user cannot receive stream data of the favorite stream type from the device object of the favorite source type. Therefore, generation of the service profile is terminated.

FIGS. 7A through 7I illustrate a process of generating a service profile using a universal remote control apparatus according to an exemplary embodiment. An initial screen of the universal remote control apparatus may include a display screen for displaying a list of service profiles and another display screen for displaying selection buttons such as NEW, DEL, and the like.

Figure 7A:
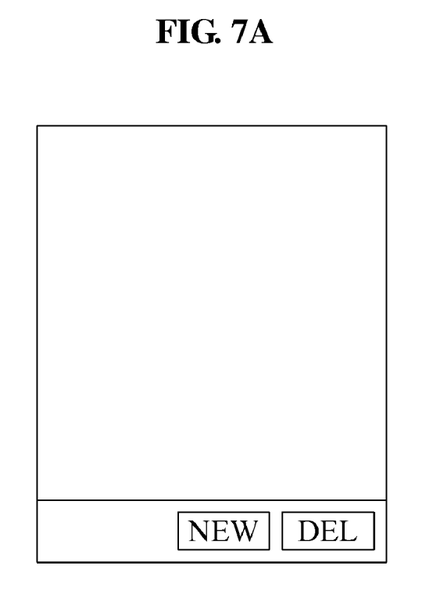
FIGS. 7A through 7I illustrate a process of generating a service profile using a universal remote control apparatus according to an exemplary embodiment.
Figure 7B:
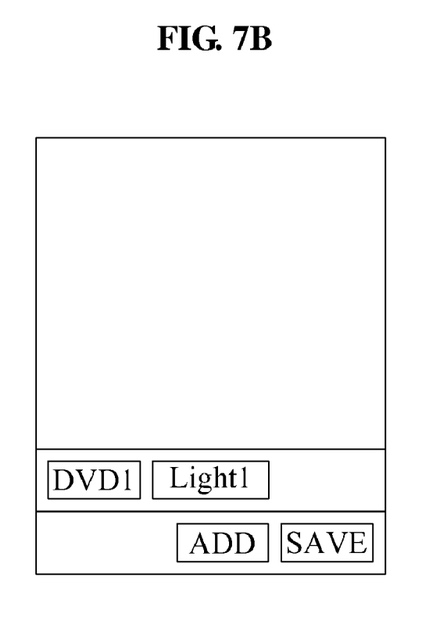
Figure 7C:
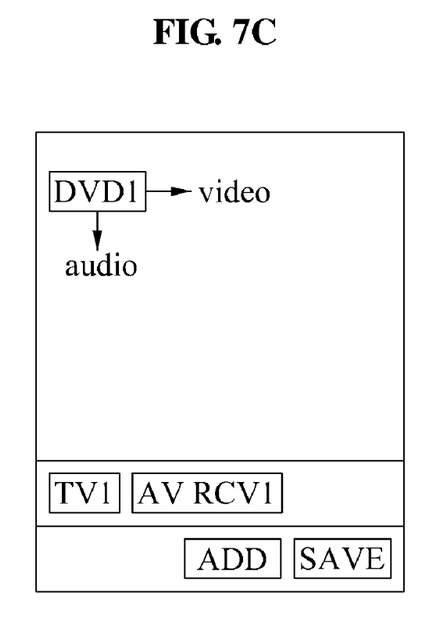
Figure 7D:
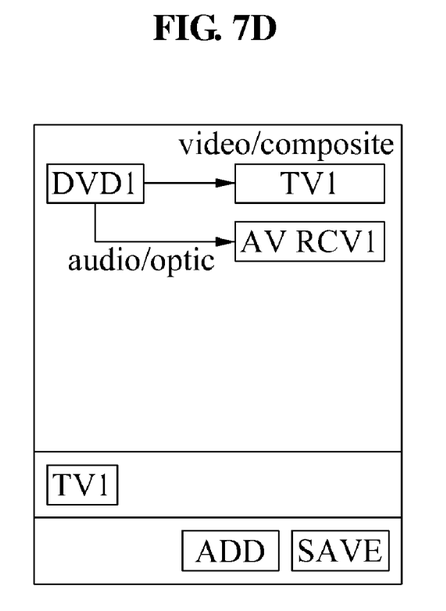

Referring to FIG. 7A, when the user selects a NEW button on the display screen that is displayed on a user interface unit of the universal remote control apparatus, the display screen for generating service profiles are displayed. Referring to FIG. 7B, the user selects DVD1 of a stream source type as a first device object, and drags and drops the selected first device object on a service generation screen. Referring to FIGS. 7C and 7D, the first device object DVD1 displayed on the service generation screen includes a video output interface and an audio output interface. When the user selects the video output interface of the first device object DVD1, a device list screen displays a list of second device objects of a stream source type that can be connected to the video output interface of the first device object DVD1.

In this instance, it is assumed that the user selects TV1 of the stream sink type on the device list screen of displaying the second device objects. When the user drags and drops the second device object TV1 on the service generation screen, connection information is generated between the first device object DVD1 of the stream source type and the second device object TV1 of the stream sink type. The user clicks a connection line between the first device object DVD1 of the stream source type and the second device object TV1 of the stream sink type and thereby selects an input interface video/composite of TV1. After connecting the first device object DVD1 and the second device object TV1, the audio output interface of the first device object DVD1 of the stream source type is connected to the input interface audio/optic of AV RCV1 of the stream sink type. In a connected state, connection information between the device objects is generated. In FIG. 7D, when the user selects an ADD button, the connection information and a service unit that includes control information generated based on the connection information are stored. Another display screen capable of generating an additional service unit is displayed.

Figure 7E:
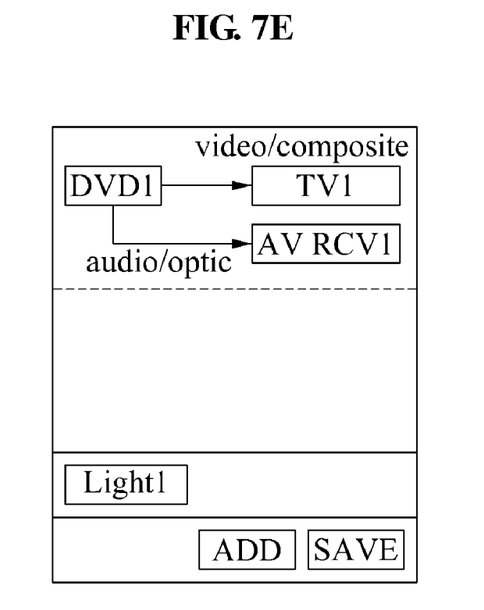

Referring to FIG. 7E, the user selects as the additional service unit a third device object Light1 of the standalone type. Next, the user drags and drops the third device object Light1 on the service generation screen. In this instance, it is assumed that the third device object Light1 has an input interface of a favorite type to receive a favorite type stream.

Figure 7F:
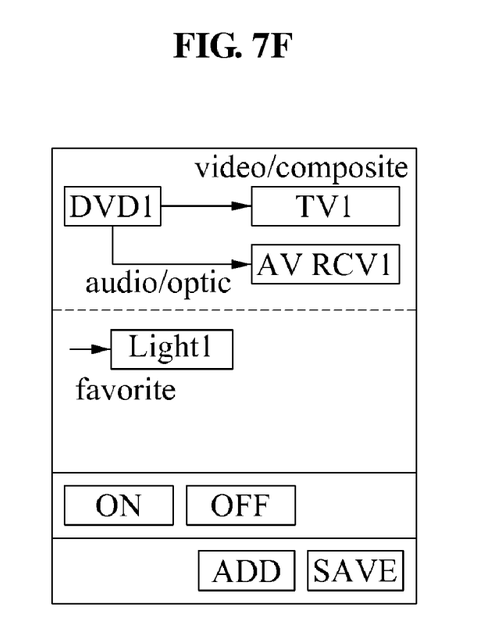

Referring to FIG. 7F, when the user selects a favorite input interface of the third device object Light1, a favorite source type device object that can be connected to the favorite input interface of the third device object Light1 is displayed on a display screen for displaying a device object list. As described above, the favorite source type device is a virtual device that is generated or set in advance by the user and thus includes information about operational conditions of the third device object Light1. When the user selects a selection button associated with an OFF object of the favorite source type from the device object list, and drags and drops the selected object on the service generation screen, connection information is generated between OFF of the favorite source type and the favorite input interface of the third object Light1.

Figure 7G:
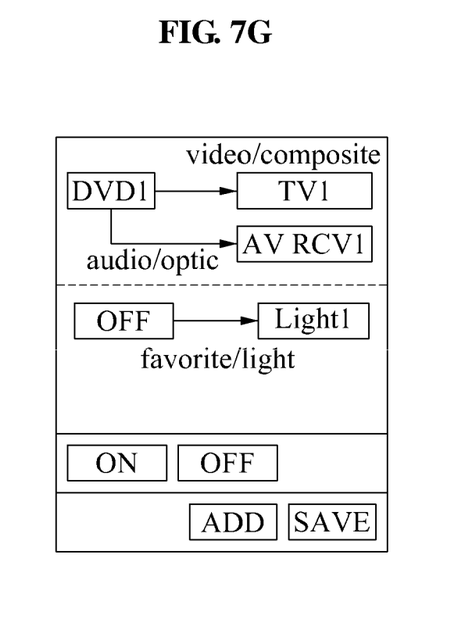

Referring to 7G, when the user pushes a SAVE button, the additional service unit is no longer generated and a process of storing a service profile can be proceeded. Specifically, a display screen for inputting a title of the service profile is displayed.

Figure 7H:
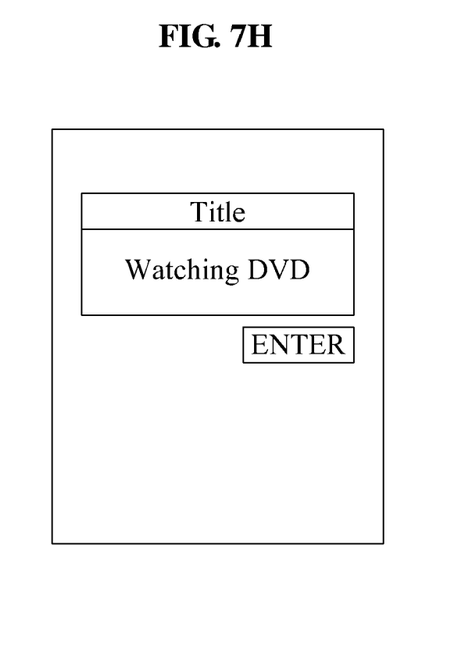
Figure 7I:
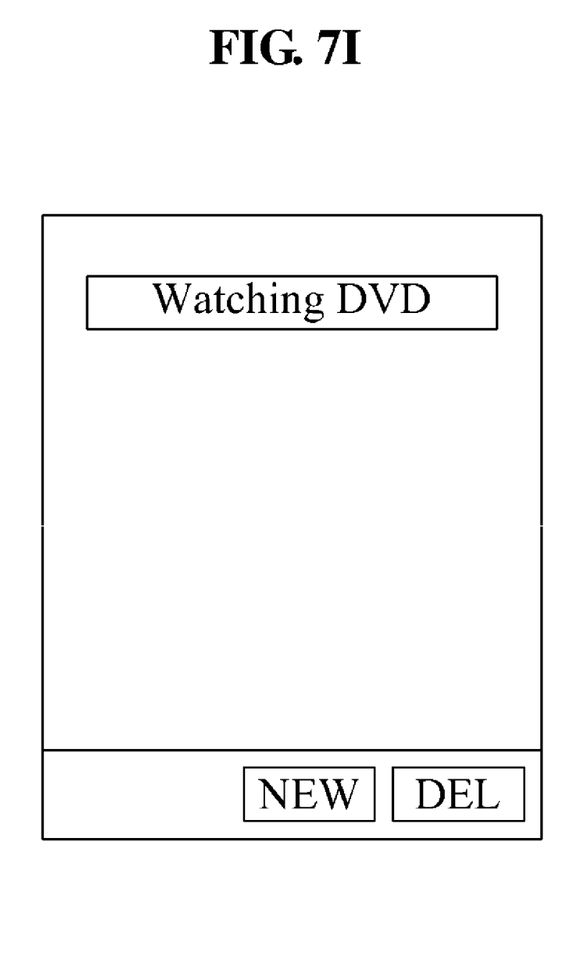

Referring to 7H and 7I, when the user enters the title of the service profile and presses an ENTER button, the service profile that includes at least one service unit is stored. In this instance, the display screen is converted to the initial screen of the universal remote control apparatus. When the service profile is stored, the universal remote control apparatus extracts control information from connection information between the entire configuration of at least one service unit and the device object that constitutes the service unit. The control information is used to control devices corresponding to the device object. The universal remote control apparatus includes the extracted control information in the service profile. The service profile is stored in a format of an XML document to be shared with another universal remote control apparatus or be generalized as a template. In FIG. 7I, the user may select a service profile displayed on the initial screen of the universal remote control apparatus and execute the selected service profile.

Figure 8:
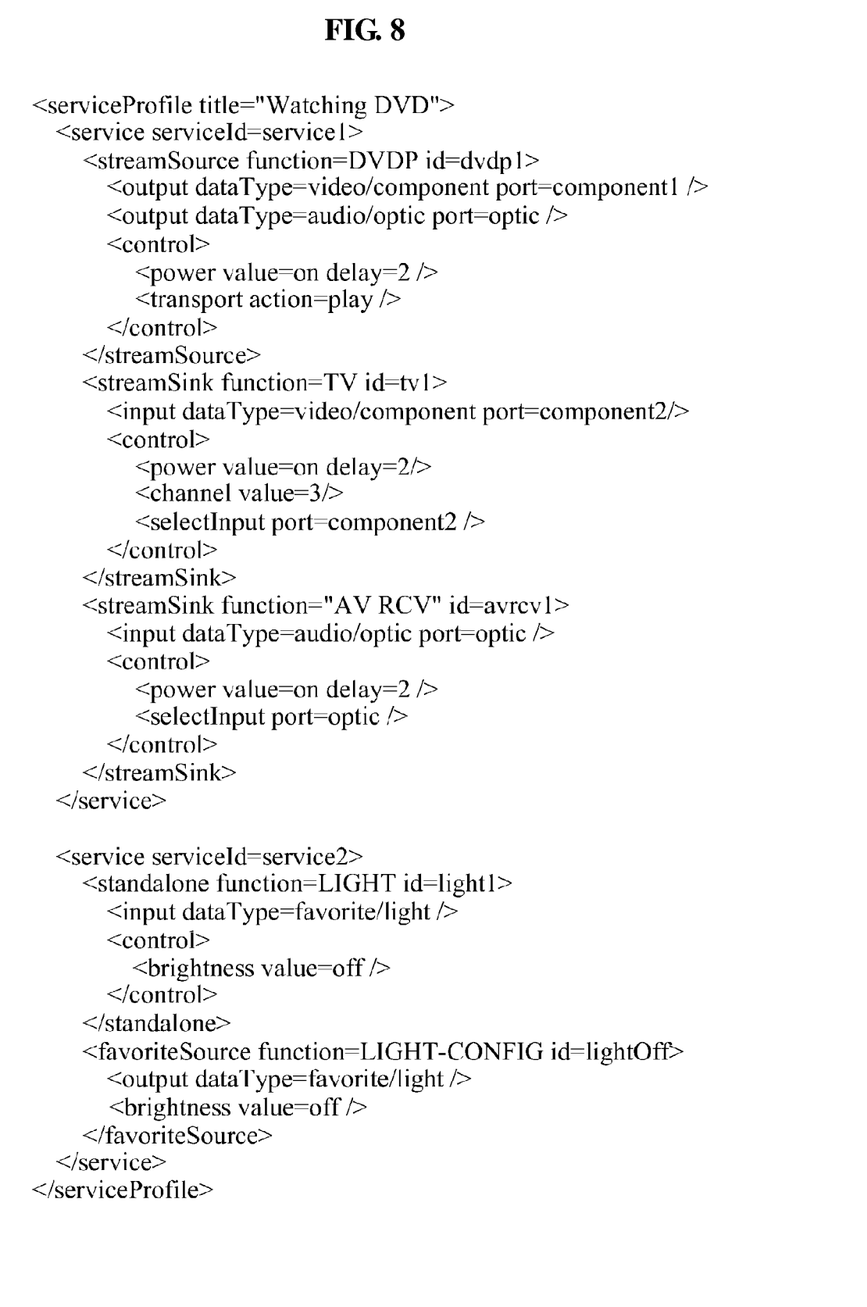
FIG. 8 is an example of a script of a service profile in a format of an XML document that is generated and stored using a universal remote control apparatus according to an exemplary embodiment.

FIG. 8 illustrates an example of a script of a service profile in a format of an XML document that is generated and stored using a universal remote control apparatus according to an exemplary embodiment.

Basic information needed for generation of the service profile may be obtained from a device object about a device. Control information for controlling a service unit that constitutes the service profile and an individual device may be extracted from connection information between a configuration of the service unit and an individual device object that constitutes the service unit. Referring to FIG. 8, the title of the service profile is "Watching DVD" and "Watching DVD" includes two service units, that is, service1 and service2.

The service unit service1 includes device object dvdp1 of a stream source type, and tv1 and avrcv1 of a stream sink type. The service unit service2 includes light1 of a standalone type and lightOff of a favorite source type. dvdp1 corresponding to the stream source type of the service unit service1 includes a video output interface and an audio output interface. The video output interface is connected to an input interface video/component2 of tv1 and the audio output interface is connected to an input interface audio/optic of avrcv1. lightOff corresponding to the favorite source type of the service unit service 2 is connected to an input interface favorite/light of light1 of the standalone type. As described above, it is possible to integrally provide a user with at least one related service such as a home entertainment service, a home automation service, and the like, without following standardized patterns.

When executing the service profile, service units of the service profile may be sequentially executed. The service units initially execute a device of the stream sink type and subsequently execute a device of the stream source type. Specifically, when the service profile "Watching DVD" is executed, the service unit service1 is executed prior to executing the service unit service2. The service unit service1 switches on avrcv1 and selects the input interface audio/optic of avrcv1. Also, the service unit service1 switches on tv1 and selects channel 3 of tv1 and selects the input interface video/component2 of tv1. Next, the service unit service1 switches on dvdp1 and plays a DVD. The service unit service2 switches off ligth1.

The above-described methods including the universal remote control method based on service profiles may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A universal remote control apparatus comprising:
a discovery module unit which discovers a plurality of devices and recognizes device information from the discovered plurality of devices including a first device and a second device;
a user interface unit which receives from a user a first selection on a first displayed device object corresponding to the first device, and in response to the user selecting the first display device object, the user interface displays a second displayed device object corresponding to the second device that is capable of receiving a stream of data from the first device in response to a second selection from the user on the second display device object;
a service profile generator which generates a service profile based on first device information and second device information that are recognized from the first device and the second device, respectively;
a service profile management unit which stores and manages the generated service profile; and
a service profile-based control unit which universally controls the first device and the second device based on the generated service profile using wireless communication.

2. The apparatus of claim 1, further comprising:
a device management unit which stores and manages the device information of the plurality of devices.

3. The apparatus of claim 1, wherein the service profile generator provides the user interface unit with the first displayed device object and/or the second displayed device object to display the first displayed device object and the second displayed device object using the user interface unit.

4. The apparatus of claim 1, wherein
the service profile generator maps the output of the first device object to the input of the second device object on the display of the user interface unit, when the user selects the second device object.

5. The apparatus of claim 4, wherein the service profile generator further generates control information for controlling the first device and the second device, and generates the service profile that includes the control information.

6. The apparatus of claim 1, wherein the stream of data corresponds to any one of a multimedia stream, a data stream, and a favorite stream.

7. The apparatus of claim 1, wherein each of the first displayed device object and the second displayed device object includes device type information, device function information, and device identification information.

8. The apparatus of claim 7, wherein the device type information includes at least one of a stream source type, a stream sink type, a standalone type, and a favorite source type.

9. The apparatus of claim 8, wherein the second displayed device object is the stream sink type and the first displayed device object is the stream source type, and
a multimedia stream or a data stream is illustrated on the user interface unit between the first device object and the second device object.

10. The apparatus of claim 1, wherein the service profile management unit stores and manages the service profile in a format of an eXtensible Markup Language (XML) document.

11. A universal remote control system comprising:
- a first device and a second device which each store and manage device information; and
- a universal remote control apparatus which recognizes the device information from the first device and the second device, and generates a service profile, wherein the universal remote control apparatus comprises:
- a discovery module unit which discovers a plurality of devices and recognizes device information from the discovered plurality of devices including the first device and the second device;
- a user interface unit which receives from a user a first selection on a first displayed device object corresponding to the first device, and in response to the user selecting the first display device object, the user interface displays a second displayed device object corresponding to the second device that is capable of receiving a stream of data from the first device in response to a second selection from the user on the second display device object;
- a service profile generator which generates the service profile based on first device information and second device information that are recognized from the first device and the second device;
- a service profile management unit which stores and manages the generated service profile; and
- a service profile-based control unit which universally controls the first device and the second device based on the generated service profile using wireless communication.

12. A universal remote control method for controlling at least one device, the method comprising:
- discovering a plurality of devices and recognizing device information from the discovered plurality of devices including a first device and a second device;
- receiving from a user a first selection on a first displayed device object corresponding to the first device which is displayed on a user interface unit;
- in response to the user selecting the first displayed device object, displaying a second displayed device object corresponding to the second device that is capable of receiving a stream of data from the first device in response to a second selection from the user on the second display device object;
- generating a service profile based on first device information and second device information that are recognized from the first device and the second device, respectively; and
- universally controlling the first device and the second device based on the generated service profile using wireless communication.

13. The method of claim 12, wherein the discovering is performed by a discovery module unit.

14. The method of claim 13, wherein the discovery module unit either recognizes the device information using a multicast-based discovery protocol or receives the device information from the user using the user interface unit.

15. The method of claim 12, further comprising:
mapping
the output of the first device object to the input of the second device object on the display of the user interface unit, when the user further selects the second device object.

16. The method of claim 12, wherein the generating of the service profile comprises:
- generating a connection between the first displayed device object and the second displayed device object on the display of the user interface unit; and
- generating control information for controlling a first device and a second device.

17. The method of claim 16, wherein the generating of the service profile comprises:
- generating at least one service unit that includes the control information, and the service profile includes the at least one service unit.

18. A non transitory computer-readable recording medium storing a program for implementing a universal remote control method for controlling at least one device, the method comprising:
- discovering a plurality of devices and recognizing device information from the discovered plurality of devices including a first device and a second device;
- receiving from a user a first selection on a first displayed device object corresponding to the first device which is displayed on a user interface unit;
- in response to the user selecting the first displayed device object, displaying a second displayed device object corresponding to the second device that is capable of receiving a stream of data from the first device in response to a second selection from the user on the second display device object;
- generating a service profile based on first device information and second device information that are recognized from the first device and the second device, respectively; and
- universally controlling the first device and the second device based on the generated service profile using wireless communication.

19. The universal remote controller of claim 1, wherein, in response to the user selecting the first displayed device object, the service profile management unit determines devices capable of receiving a stream of data from the first device, and the user interface unit displays device objects corresponding to each of the devices capable of receiving a stream of data from the first device.

* * * * *